US012759241B2

(12) United States Patent
Rendahl et al.

(10) Patent No.: US 12,759,241 B2
(45) Date of Patent: Oct. 13, 2026

(54) ACCOMMODATION OF DECOMPOSITION OF OBJECTS CREATED USING ADDITIVE MANUFACTURING

(71) Applicant: International Business Machines Corporation, Armonk, NY (US)

(72) Inventors: Randy A. Rendahl, Raleigh, NC (US); Tushar Agrawal, West Fargo, ND (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 18/454,778

(22) Filed: Aug. 23, 2023

(65) Prior Publication Data

US 2025/0065570 A1 Feb. 27, 2025

(51) Int. Cl.
*B33Y 50/02* (2015.01)
*B29C 64/364* (2017.01)
(Continued)

(52) U.S. Cl.
CPC .......... *B29C 64/393* (2017.08); *B29C 64/364* (2017.08); *G06F 30/20* (2020.01);
(Continued)

(58) Field of Classification Search
CPC ..... B29C 64/393; B29C 64/364; G06F 30/20; G06F 2113/10; G06F 2119/20; B33Y 50/02
See application file for complete search history.

(56) References Cited

U.S. PATENT DOCUMENTS

2013/0337277 A1* 12/2013 Dikovsky ............... B29C 64/40 435/197
2016/0016362 A1* 1/2016 Kim ....................... B23Q 15/00 700/98
(Continued)

FOREIGN PATENT DOCUMENTS

EP 3162841 B2 6/2022
WO 2020181012 A1 9/2020

OTHER PUBLICATIONS

Kaneko et al., A decomposition procedure for large-scale optimum plastic design problems, International Journal for Numerical Methods in Engineering, 1983, 873-889, vol. 19 Link: https://doi.org/10.1002/nme.1620190609.
(Continued)

*Primary Examiner* — Christopher E. Everett
(74) *Attorney, Agent, or Firm* — Onyx IP Group

(57) ABSTRACT

A decomposition monitoring platform may determine one or more materials, for a three-dimensional (3D) printed object, that are decomposable in an environment. The platform may generate a computer-aided design of the 3D printed object utilizing the determined one or more materials. The platform may create the 3D printed object utilizing the generated computer-aided design and the determined one or more decomposable materials. The platform may deploy the 3D printed object in the environment to cause a decomposition process of the 3D printed object to be initiated. The platform may monitor the decomposition process of the 3D printed object in the environment. The platform may adjust a design of subsequent 3D printed objects based on the monitored decomposition process.

20 Claims, 8 Drawing Sheets

(51) Int. Cl.

| | |
|---|---|
| ***B29C 64/393*** | (2017.01) |
| ***G06F 30/20*** | (2020.01) |
| *G06F 113/10* | (2020.01) |
| *G06F 119/20* | (2020.01) |

(52) U.S. Cl.

CPC ........... *B33Y 50/02* (2014.12); *G06F 2113/10* (2020.01); *G06F 2119/20* (2020.01)

(56) References Cited

U.S. PATENT DOCUMENTS

| | | | | |
|---|---|---|---|---|
| 2018/0341248 | A1* | 11/2018 | Mehr ...................... | B22F 10/00 |
| 2019/0001655 | A1* | 1/2019 | Blom ...................... | B33Y 50/02 |
| 2019/0001658 | A1* | 1/2019 | Mathews, Jr. ......... | B33Y 50/02 |
| 2020/0242495 | A1* | 7/2020 | Roychowdhury ...... | B22F 10/36 |
| 2022/0340731 | A1 | 10/2022 | Xu | |
| 2022/0404795 | A1 | 12/2022 | Rodriguez Bravo | |

OTHER PUBLICATIONS

Anonymous, Additives to induce Biodegradability in Toner Materials, IP.com No. IPCOM000185240D, IP.com Electronic Publication Date: Jul. 16, 2009.

Anonymous, Fabrication of Smart Components using Additive Manufacturing, IP.com No. IPCOM000268962D, IP.com Electronic Publication Date: Mar. 11, 2022.

Anonymous, Method and System for 3D Printer Selection of Appropriate Material and Settings for Different Portions of a 3D Printed Object Based on Operational Parameters, IP.com No. IPCOM000271770D, IP.com Electronic Publication Date: Feb. 7, 2023.

Yu et, al., Evolutionary decomposition for 3D printing, GECCO 2017, Jul. 15-19, 2017, pp. 1-8, Berlin, Germany.

Pangburn, Decay by design: These 3D printed organic plastics naturally decompose, May 15, 2019, pp. 1-9. Link: https://www.fastcompany.com/90348990/decay-by-design-these-3d-printed-organic-plastics-naturally-decompose.

Zhao et al., Mixed-layer adaptive slicing for robotic Additive Manufacturing (AM) based on decomposing andregrouping, Journal of Intelligent Manufacturing, Sep. 10, 2019, pp. 985-1002, Springer Science+Business Media, LLC. Link: https://link.springer.com/article/10.1007/s10845-019-01490-z.

* cited by examiner

ACCOMMODATION OF DECOMPOSITION OF OBJECTS CREATED USING ADDITIVE MANUFACTURING

BACKGROUND

The present invention relates to additive manufacturing, and for example, to facilitate disposal of objects created using additive manufacturing by enabling the decomposition of the object. Additive manufacturing (or three-dimensional (3D) printing process) is a process of creating a 3D object based on a digital file of the object. The digital file may include data of a computer aided design (CAD) of the 3D printed object or a digital 3D model of the 3D printed object. The 3D printed object is created by an additive process during which successive layers of material are deposited until the 3D printed object is created.

SUMMARY

A computer-implemented method, for monitoring decomposition of materials, may comprise determining one or more materials, for a three-dimensional (3D) printed object, that are decomposable in an environment; generating a computer-aided design of the 3D printed object utilizing the determined one or more materials; creating the 3D printed object utilizing the generated computer-aided design and the determined one or more decomposable materials; deploying the 3D printed object in the environment to cause a decomposition process of the 3D printed object to be initiated; monitoring the decomposition process of the 3D printed object in the environment; and adjusting a design of subsequent 3D printed objects based on the monitored decomposition process.

A computer program product comprising: one or more computer readable storage media, and program instructions collectively stored on the one or more computer readable storage media, the program instructions may comprise program instructions to obtain, from a data store, material information identifying one or more materials, for a first three-dimensional (3D) printed object, that are decomposable in an environment; program instructions to design the first 3D printed object based on the material information; program instructions to create the first 3D printed object utilizing the one or more materials; program instructions to configure the first 3D printed object to initiate a decomposition process of the first 3D printed object in the environment; program instructions to monitor the decomposition process of the first 3D printed object in the environment; and program instructions to adjust a design of a second 3D printed object based on the monitored decomposition process.

A system comprising one or more devices may be configured to obtain, from a data store, material information identifying a decomposition rate of one or more materials in an environment; design a first object for additive manufacturing based on the decomposition rate; create the first object utilizing the one or more materials and an additive manufacturing printer after designing the object; configure the first object to initiate a decomposition process of the object in the environment; monitor the decomposition process of the first object in the environment; and adjust a design of a second object based on the monitored decomposition process.

DETAILED DESCRIPTION

Figure 1A:
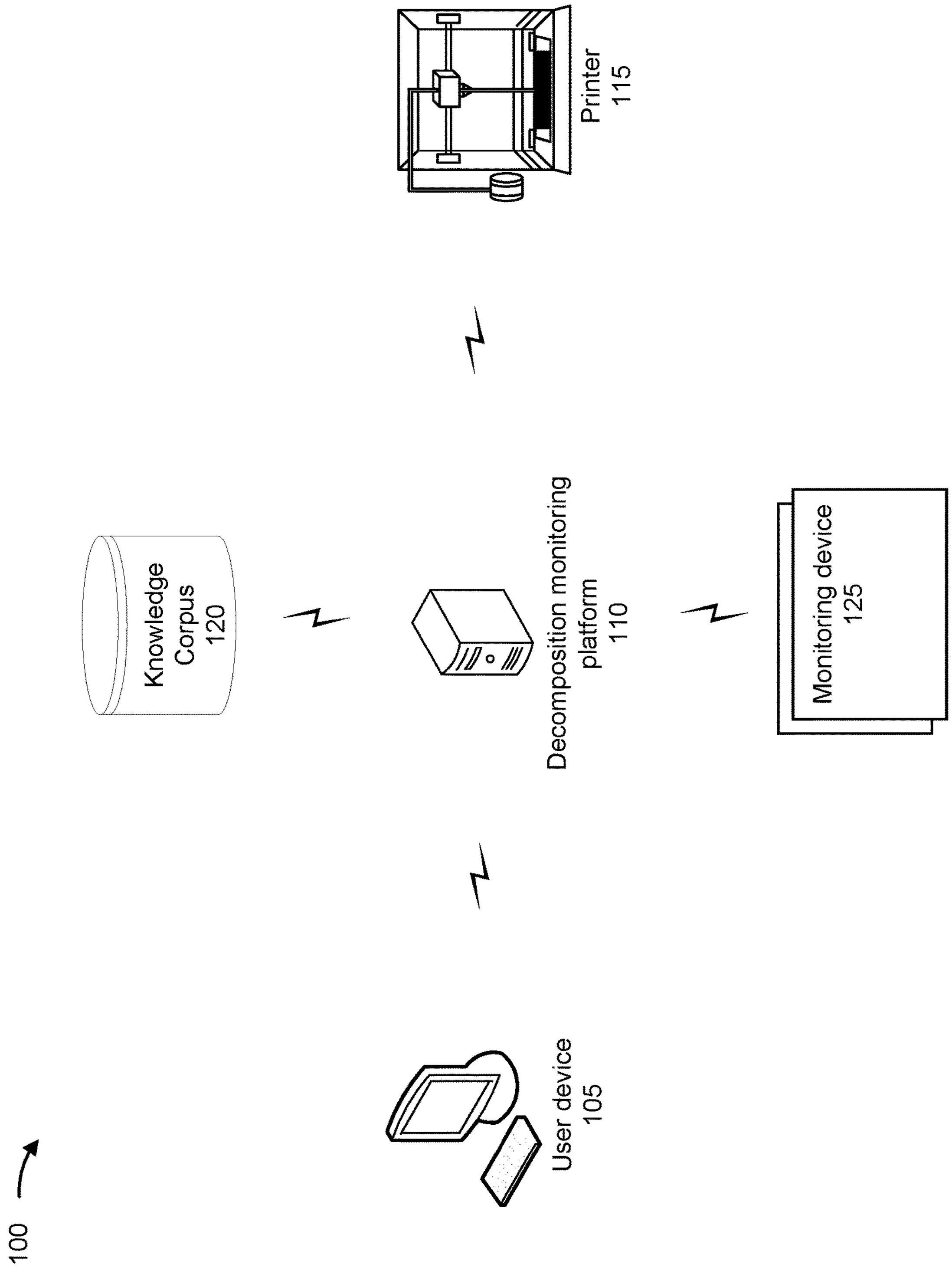
FIGS. 1A-1E are diagrams of an example implementation described herein.

The following detailed description of example implementations refers to the accompanying drawings. The same reference numbers in different drawings may identify the same or similar elements.

A structure may be created using a 3D printing process. The structure may be created to be used for a particular purpose and over a particular period of time. After the structure has been used for the particular purpose and after the particular period of time, the structure may be disposed of. In some instances, the disposal of the structure may involve demolishing (or destroying) the structure.

Depending on the size of the structure, demolishing the structure may be a process that is subject to multiple potential problems. For example, demolishing the structure (when the structure is a large structure) is subject to multiple issues. As used herein, a large structure may broadly refer to a structure with a size that exceeds a size threshold. For example, the large structure may be a vehicle, a wall, a large piece of furniture, and/or a room or similar an enclosed space, among other examples.

As an example, depending on the size of the structure, demolishing the structure may be a time-consuming process. For example, the size of the structure may require multiple steps (or multiple passes) for demolishing the structure. In some instances, the steps may have to be repeated numerous times to properly demolish the structure.

Additionally, or alternatively, depending on the size of the structure, demolishing the structure may be an expensive process. For example, depending on the size of the structure, demolishing the structure may require the use of multiple devices. The multiple devices may include construction equipment, such as a construction vehicle. Acquiring or renting the devices may be expensive.

Additionally, or alternatively, demolishing the structure may require configuring the multiple devices to ensure that each device performs a respective task. In some instances, demolishing the structure may require configuring the multiple devices to enable the devices to communicate with each other. In this regard, configuring the multiple devices may consume computing resources, storage resources (to store instructions for operating the devices), and/or network resources (for communicating between the devices).

Additionally, or alternatively, demolishing the structure may have negative impact on the environment. Accordingly, a need exists to improve the disposal of large structures created using a 3D printing process after the structures have been used for a specified period of time.

Implementations described herein provide solutions to overcome the above issues relating to disposal of a structure. For example, implementations described herein are directed to improving a manner in which an object is disposed of after the object has been used for a specified period of time (e.g., intended life of the 3D printed object). The object may be a 3D printed object.

For example, the object may be a 3D structure. The size of the object may exceed a size threshold. For example, the object may be a large structure, such as a shelter for disaster relief efforts, a holiday decoration, medical equipment, a large piece of furniture, a vehicle, a wall, and/or a room or another enclosed space, among other examples.

Implementations described herein are directed to a system that may identify appropriate materials to be used during a 3D printing process to print the 3D printed object. The system may select materials that may decompose within an environment in which the 3D printed object is deployed, after the 3D printed object has been used for a specified period of time. In this regard, after the 3D printed object has been for the specified period of time in the environment, a decomposition process may be initiated to decompose the 3D printed object.

In some examples, the decomposition process may be triggered (or initiated) based on a reaction between the materials and environmental conditions of the environment. The environmental conditions may include water, salt, sunlight, chemicals, and/or high pressure wind, among other examples. In some examples, the decomposition process may be triggered by a device embedded in the 3D printed object. For instance, the device may simulate occurrence of the environmental conditions.

The system may monitor the decomposition process to determine whether the decomposition of the 3D printed object is progressing as intended. By selecting materials based on the decomposition rates and the specified period of time, the system may be used to create objects that decompose at different rates, depending on the use or the needs of the objects. For example, one object may be designed to decompose in a landfill at a first rate while another object may be designed to decompose in a natural setting at a second rate that is less than the first rate.

Based on the foregoing, irrespective of the size of the 3D printed object, the decomposition of the materials may facilitate the disposal of the 3D printed object. Accordingly, to address the problem of disposing of the 3D printed object (which may be a large 3D printed object), implementations described herein involve identifying materials that can be used to print the 3D printed object in a way that the 3D printed object can decompose within the surrounding environment. In this regard the decomposition of the materials may replace the demolition process or significantly reduce the need for the demolition of the 3D printed object.

By preventing or significantly reducing the demolition of the 3D printed object, implementations described herein may facilitate disposal of the 3D printed object after the specified period of time. By preventing or significantly reducing the demolition of the 3D printed object, implementations described herein may preserve computing resources, storage resources, and/or network resources that would have been consumed by using multiple devices to demolish the 3D printed object.

Implementations described herein may be used in various industries, such as the construction industry, the manufacturing industry, the healthcare industry, and/or any industry that needs to create objects that are meant to be temporary or used for a specific time period. While examples herein are described with respect to objects created using a 3D printing process, implementations described herein are applicable to objects created using a 4D printing process. The 4D printing process uses the same techniques as the 3D printing process. However, in the 4D printing process, the printed 3D printed object is capable of transforming after being subject to an environmental stimulus, such as heat, moisture, and/or wind, among other examples.

FIGS. 1A-1E are diagrams of an example implementation 100 described herein. As shown in FIGS. 1A-1E, example implementation 100 includes user device 105, a decomposition monitoring platform 110, printer 115, a knowledge corpus 120, and one or more monitoring devices 125 (individually monitoring device 125 and collectively monitoring devices 125). These devices are described in more detail below in connection with FIG. 2.

User device 105, decomposition monitoring platform 110, printer 115, knowledge corpus 120, and/or monitoring devices 125 may form a system configured to schedule and monitor the decomposition of 3D printed objects. By scheduling and monitoring the decomposition of 3D printed objects, the system may facilitate disposal of the 3D printed objects.

User device 105, decomposition monitoring platform 110, printer 115, knowledge corpus 120, and monitoring devices 125 may be connected via wired connections, wireless connections, or a combination of wired and wireless connections. The devices may be connected via a network that includes one or more wired and/or wireless networks. For example, the network may include Ethernet switches. Additionally, or alternatively, the network may include a cellular network, a public land mobile network (PLMN), a local area network (LAN), a wide area network (WAN), a private network, the Internet, and/or a combination of these or other types of networks. The network enables communication between user device 105, decomposition monitoring platform 110, printer 115, knowledge corpus 120, and monitoring devices 125.

User device 105 may include one or more devices configured to receive, generate, store, process, and/or provide information associated with decomposition of a 3D printed object, as explained herein. As used herein, a "3D printed object" may broadly refer to an object printed using additive manufacturing. The object may be created using a 3D printing process or using a 4D printing process. User device 105 may be used to provide printing information that may be used to create the 3D printed object.

User device 105 may include a communication device and a computing device. For example, user device 105 may include a wireless communication device, a mobile phone, a user equipment, a laptop computer, a tablet computer, a desktop computer, and/or a similar type of device.

Decomposition monitoring platform 110 may include one or more devices configured to receive, generate, store, process, and/or provide information associated with decomposition of the 3D printed object as explained herein. For example, decomposition monitoring platform 110 may identify materials that may be used to create the 3D printed object (e.g., based on information from user device 105). The materials may be decomposable in an environment in which the 3D printed object is deployed. Decomposition monitoring platform 110 may monitor a decomposition process of the 3D printed object and may update material information (e.g., stored in knowledge corpus 120) regarding a decomposition rate of the materials.

Printer 115 may include one or more devices configured to receive, generate, store, process, and/or provide information associated with decomposition of the 3D printed object, as explained herein. For example, printer 115 may be configured to create (or fabricate) the 3D printed object by way of the 3D printing process discussed herein. Additionally, or alternatively, printer 115 may be configured to create (or fabricate) the 3D printed object by way of the 4D printing process discussed herein. In the example herein, printer 115 may be used to print the 3D printed object. Printer 115 may be included in a cloud environment.

Knowledge corpus 120 may include one or more devices configured to receive, generate, store, process, and/or provide information associated with decomposition of the 3D printed object, as explained herein. For example, knowledge corpus 120 may include a storage device that stores a data store. In some implementations, knowledge corpus 120 may include a database or the like in a data structure, e.g., a table, and/or a linked list or the like, that stores material information regarding different materials that may be used by printer 115. The material information may be historical data regarding the different materials. The historical data may be obtained based on monitoring the decomposition of the different materials.

As an example, the material information of a material may indicate whether the material is decomposable. If the material is not decomposable, the material information may indicate whether the material may be recycled and reused. If the material is decomposable, the material information may indicate decomposition rates of the material in different environments, decomposition rates of the material with respect to different environmental conditions, and/or a lifespan of the material, among other examples.

For example, the material information may indicate a first decomposition rate in a first environment (e.g., an ocean front environment), a second decomposition rate in a second environment (e.g., a desert environment), a third decomposition rate in a third environment (e.g., a cold environment), and so on. Additionally, or alternatively, the material information may indicate a fourth decomposition rate with respect to a first environmental condition (e.g., wind), a fifth decomposition rate in a second environmental condition (e.g., sunlight), and so on.

Additionally, or alternatively, the material information may indicate different decomposition rates with respect to different chemicals. In other words, the material information may indicate the properties of the material used to print the object. Additionally, or alternatively, the material information may indicate the strength of the material, a durability of the material, and any other relevant characteristics of the material.

In other words, the material information may indicate properties of the material. The system described herein may leverage the historical data of knowledge corpus 120 to determine whether the 3D printed object should be demolished completely or if certain components of the 3D printed object can be retained and reused for future 3D printed objects. The system described herein is directed to optimizing the disposal of the 3D printed object and reduce waste material in the environment.

A monitoring device 125 include one or more devices configured to receive, generate, store, process, and/or provide information associated with decomposition of the 3D printed object, as explained herein. For example, the monitoring device 125 may include a device configured to monitor a decomposition of the 3D printed object and generate monitoring data indicating a level of decomposition of the 3D printed object.

The monitoring device 125 may provide the monitoring data periodically (e.g., every day, every month, and/or every month, among other examples). Additionally, or alternatively, the monitoring device 125 may provide the monitoring data based on a trigger (e.g., based on a request from user device 105 and/or based on a request from decomposition monitoring platform 110, among other examples). The monitoring data may be used to determine a current decomposition rate of the 3D printed object (e.g., used to determine a current decomposition rate of the 3D printed object).

For instance, the monitoring device 125 may include a camera device. The camera device may be configured to capture image data and/or video data of the 3D printed object. For example, the camera device may be configured to capture images of the 3D printed object. The monitoring data may include the image data and/or the video data.

In some implementations, the camera device may be mounted on a structure in the environment. Additionally, or alternatively, the camera device may be mounted to a vehicle. The vehicle may be configured to travel from different locations to a location of the 3D printed object to capture images of the 3D printed object. The different locations may be locations of additional 3D printed objects being monitored by the camera device in a manner similar to a manner in which the 3D printed object is monitored.

Additionally, or alternatively, the monitoring device 125 may include a sensor device configured to sense the decomposition of the 3D printed object. In some examples, the monitoring device 125 may be a light sensor device embedded in the 3D printed object. The monitoring device 125 may be embedded at a location associated with a particular level of decomposition. In this regard, based on detecting light, the monitoring device may generate sensor data indicating that light has been detected. Detecting the light may indicate that the 3D printed object has been decomposed to a particular level. The monitoring data may include the sensor data.

Additionally, or alternatively, the monitoring device 125 may include a light detection and ranging (LIDAR) sensor embedded in the 3D printed object. The monitoring device 125 may be embedded at a location associated with a particular level of decomposition. In this regard, as the LIDAR remains embedded, the time of reflected light may be less than a particular amount of time. However, as the 3D printed object is decomposed to the point of exposing the LIDAR, the time for the reflected flight may significantly exceed the particular amount of time. The monitoring data may include data, associated with decomposition, generated by the LIDAR.

Additionally, or alternatively, the monitoring device 125 may include an X-ray device, a thermal device, among other examples. The monitoring device 125 may be mounted to the 3D printed object. Additionally, or alternatively, the monitoring device 125 may be mounted to a structure in the environment. Additionally, or alternatively, the monitoring device 125 may be mounted to the vehicle, as described above.

Figure 1B:
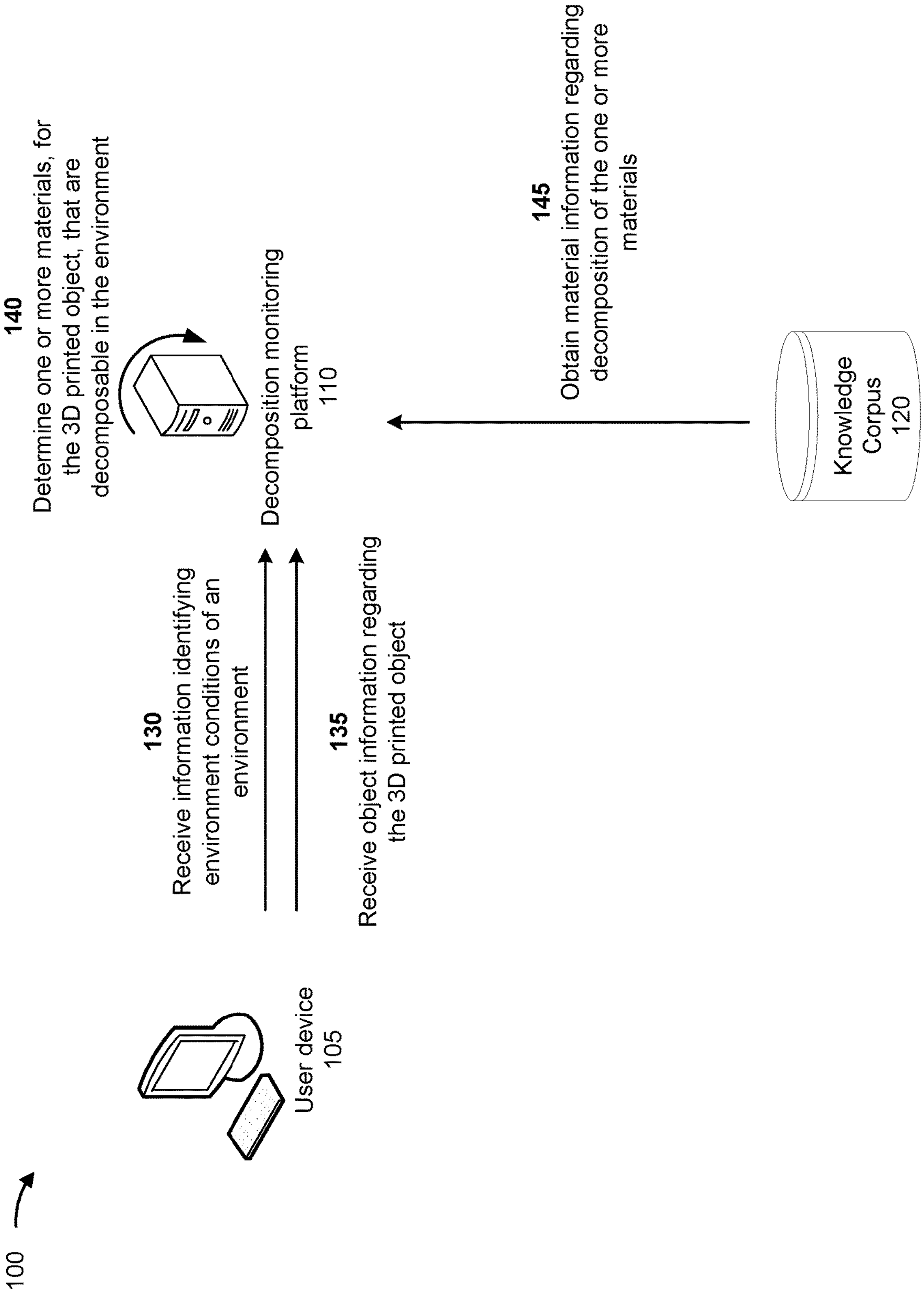

As shown in FIG. 1B, and by reference number 130, decomposition monitoring platform 110 may receive environment information identifying environment conditions of an environment. For example, decomposition monitoring platform 110 may receive the environment information from user device 105. The environment information may identify environmental conditions in which the 3D printed object will be used, such as temperature, a level of humidity (or moisture), a level of wind, and/or a level of dust or other contaminants, among other examples of environmental conditions that may affect the decomposition process of the 3D printed object.

Additionally, or alternatively, the environment information may identify the environment. For example, the environment information may indicate that the environment is generally an outdoor environment or an indoor environment. Additionally, or alternatively, the environment information may specifically indicate that the environment is a beach with a significant salt saturation or a controlled lab. Decomposition monitoring platform 110 may use the environment information to identify the environment and/or to identify the environmental conditions.

As shown in FIG. 1B, and by reference number 135, decomposition monitoring platform 110 may receive object information regarding the 3D printed object. For example, decomposition monitoring platform 110 may receive information about the object to be monitored from user device 105. This object information may identify a specified functional life of the 3D printed object. In other words, the object information may indicate a specified period of time during which the 3D printed object is to be used after the 3D printed object is deployed in the environment.

Additionally, or alternatively, the object information may indicate a planned usage of the 3D printed object. For example, the object information may indicate that the 3D printed object is to be used as a temporary shelter for disaster relief efforts that is designed to decompose within a particular period of time, reducing the need for disposal. Additionally, or alternatively, the 3D printed object may be used as a holiday decoration that is meant to be used for a specific time period and then decompose.

Additionally, or alternatively, the 3D printed object may be used as medical equipment that is meant to be used for a specific time period and then decompose, reducing the need for disposal and helping to reduce the spread of infection. Additionally, or alternatively, the 3D printed object may be used as a temporary structure or material that is meant to be used for a specific time period and then decompose. Additionally, or alternatively, the 3D printed object may be used as a packaging material that is meant to be used for a specific time period and then decompose.

Additionally, or alternatively, the object information may indicate that the 3D printed object is to be designed to activate a decomposition process based on a decomposition trigger. The decomposition trigger may include a decomposition inducing substance introduced into the environment or include a decomposition agent embedded in the 3D printed object. The decomposition agent may include a device or a 4D printed item that reacts to environment factors.

Additionally, or alternatively, the object information may include item information identifying the 3D printed object. The item information may identify a size of the 3D printed object, a shape of the 3D printed object, a complexity of the 3D printed object, a functionality of the 3D printed object, decomposable components that are to be decomposed, and/or reusable components that are to be reused (e.g., to create additional 3D printed objects). The printing information and/or the item information may identify one or more materials that may be used to print the 3D printed object.

As shown in FIG. 1B, and by reference number 140, decomposition monitoring platform 110 may determine one or more materials, for the 3D printed object, that are decomposable in the environment. For example, based on the environment information and/or the object information, decomposition monitoring platform 110 may identify materials that are to be used for printing the 3D printed object. Decomposition monitoring platform 110 may select the one or more materials based on their ability to decompose within the environment.

In some implementations, decomposition monitoring platform 110 may determine filaments that include the one or more materials. For example, decomposition monitoring platform 110 may use a filament materials corpus reference to identify the filament. The filament materials corpus reference may include a database or the like in a data structure, e.g., a table, and/or a linked list or the like, that stores information identifying different filaments in association with information identifying different materials. In this regard, decomposition monitoring platform 110 may identify the filament based on information identifying the one or more materials.

As shown in FIG. 1B, and by reference number 145, decomposition monitoring platform 110 may obtain material information regarding decomposition of the one or more materials. In some implementations, decomposition monitoring platform 110 may obtain the material information from knowledge corpus 120. For example, decomposition monitoring platform 110 may obtain the material information using information identifying the filament and/or using information identifying the one or more materials.

The material information, of each material, may indicate whether the material is reusable, may indicate whether the material is decomposable, may indicate a decomposition rate of the material in the environment, may indicate a structural integrity degradation of the material during decomposition, among other examples.

Figure 1C:
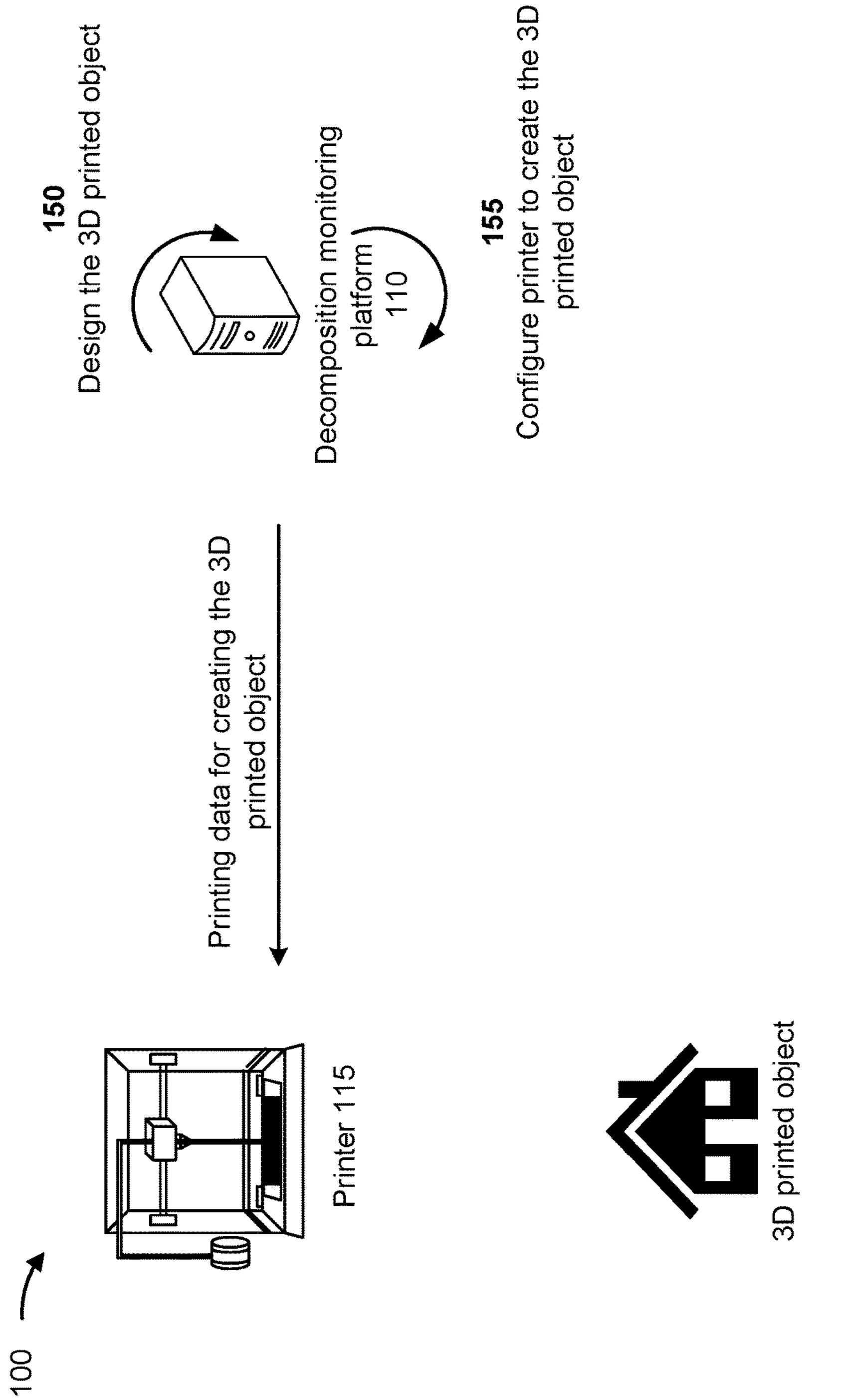

As shown in FIG. 1C, and by reference number 150, decomposition monitoring platform 110 may design the 3D printed object. In some implementations, based on the object information, decomposition monitoring platform 110 may determine reusable components of the 3D printed object that can be reused for future 3D printing objects and decomposable components of the 3D printed object that can be decomposed. During the design, decomposition monitoring platform 110 may assign reusable components to materials identified as reusable and may assign decomposable components to materials identified as decomposable.

The materials, identified as decomposable, may remain viable for the specified period of time (e.g., the intended life of the 3D printed object), but minimally longer. In other words, materials that rapidly decompose in the environment after lasting the intended life are preferred over other materials that decompose at a slower rate in the environment.

In this regard, decomposition monitoring platform 110 may analyze the material information to identify materials that decompose in the environment. Decomposition monitoring platform 110 may further identify a subset of the materials with highest decomposition rates in the environment out of the materials that decompose in the environment.

In the event the decomposition is to be triggered, decomposition monitoring platform 110 may select the materials with the most efficient decomposition. In some implementations, price, decomposition rate, resultant materials (waste or reusable) may be used in selecting among various options for triggering the decomposition process.

In some implementations, decomposition monitoring platform 110 may generate a computer-aided design of the 3D printed object utilizing the one or more materials. For example, decomposition monitoring platform 110 may generate a digital model of the 3D printed object using computer-aided design software. The digital model may be generated by taking into account the one or more materials and may be used to guide the 3D printing process.

As shown in FIG. 1C, and by reference number 155, decomposition monitoring platform 110 may configure the printer to create the 3D printed object. In some implementations, decomposition monitoring platform 110 may generate printing data that may be used to configure printer 115 to print the 3D printer object based on the digital model of the 3D printed object, based on the object information, and/or based on information regarding the design of the 3D printer object, among other examples.

The printing data may include information about the 3D printing process, such as a type of printer to be used, the materials to be used, and any relevant settings or parameters that may be used by printer 115 to print (or create) the 3D printed object.

As shown in FIG. 1C, decomposition monitoring platform 110 may provide the printer data to printer 115 to configure printer 115 to print the 3D printed object. As part of configuring printer 115, the printer data may be used to prepare the materials for printing. For example, printer 115 may select the filament with the one or more materials identified by decomposition monitoring platform 110. As part of configuring printer 115, the printer data may be used to initiate heating the materials and to ensure that the materials are in the correct form for printer 115.

Based on being configured using the printer data, printer 115 may initiate the 3D printing process by depositing successive layers of the material to create the 3D printed object. As shown in FIG. 1C, the 3D printed object may be a temporary shelter for disaster relief efforts that is designed to decompose after the shelter is deployment in the environment for the specified period of times.

In some implementations, the 3D printed object may include one or more devices that are configured to trigger the decomposition process. In some example, the one or more devices may be configured to trigger the decomposition process by emulating the environmental conditions that trigger the decomposition process. For example, the one or more devices may be configured to generate heat, moisture, and/or wind, among other examples.

Figure 1D:
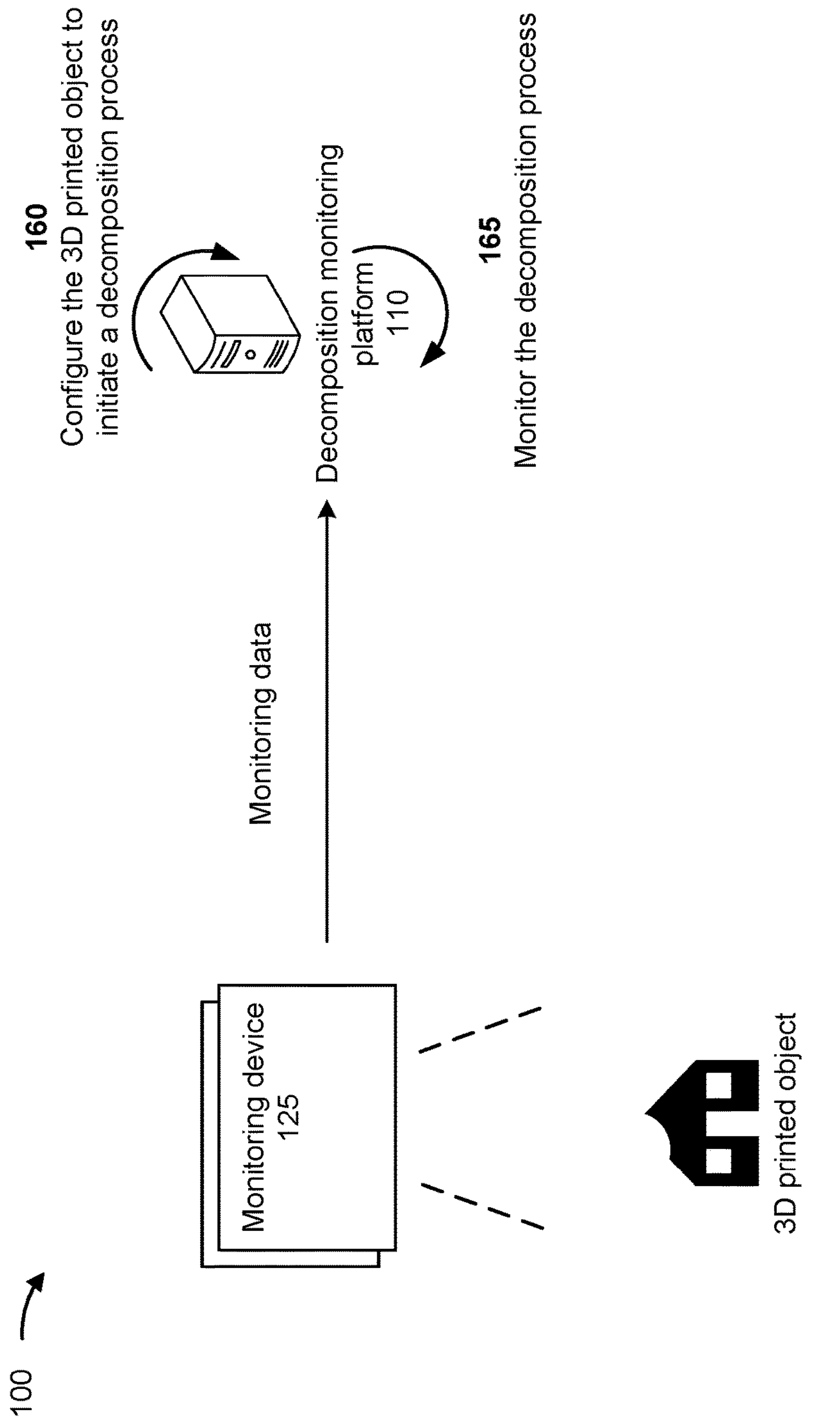

As shown in FIG. 1D, and by reference number 160, decomposition monitoring platform 110 may configure the 3D printed object to initiate a decomposition process. For example, once the 3D printed object has been printed, the 3D printed object may be programmed to initiate the decomposition process using the one or more devices embedded within the 3D printed object. For example, decomposition monitoring platform 110 may pre-configure the one or more devices to emulate the environmental conditions after the 3D printed object has been deployed in the environment for the specified period of time. Additionally, or alternatively, after the 3D printed object has been deployed in the environment for the specified period of time, decomposition monitoring platform 110 may provide signals (e.g., wireless signals) to cause the one or more devices to emulate the environmental conditions.

In some implementations, decomposition monitoring platform 110 may modify the environmental conditions of the environment to initiate the decomposition process. For example, decomposition monitoring platform 110 may adjust the temperature in the environment (e.g., by adjusting an operation of a heating, ventilation, and air conditioning (HVAC) unit), may adjust the level of moisture in the environment (e.g., by adjusting an operation of an HVAC unit), may adjust the level of wind in the environment (e.g., by adjusting an operation of a wind turbine), and/or may cause chemicals to be released in the environment, among other examples.

In some examples, decomposition monitoring platform 110 may modify the environmental conditions at a specific date (e.g., after the 3D printed object has been deployed in the environment for the specified period of time). Additionally, or alternatively, decomposition monitoring platform 110 may modify the environmental conditions periodically after the 3D printed object has been deployed in the environment for the specified period of time. In some implementations, the 3D object may initiate the decomposition process based on a reaction with the environmental conditions to be initiated.

As shown in FIG. 1D, and by reference number 165, decomposition monitoring platform 110 may monitor the decomposition process. For example, one or more monitoring devices 125 may monitor the decomposition process and may generate monitoring data regarding the decomposition process. Decomposition monitoring platform 110 may receive the monitoring data and analyze the monitor data based on the monitoring data. Based on the monitoring data, decomposition monitoring platform 110 may determine the current decomposition rate of the 3D printed dimension (e.g., the current decomposition rate of the materials).

Figure 1E:
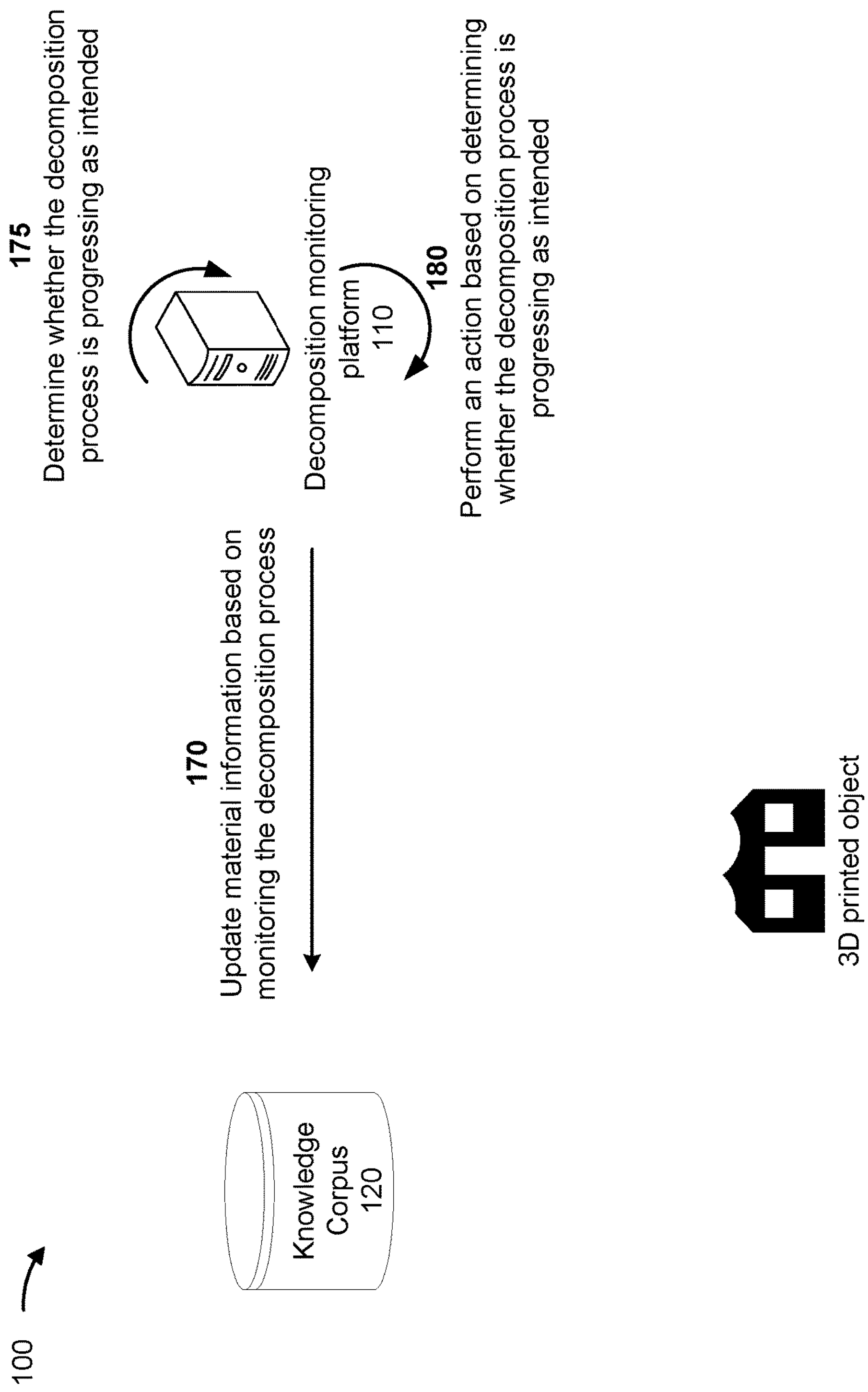

As shown in FIG. 1E, and by reference number 170, decomposition monitoring platform 110 may update material information based on monitoring the decomposition process. For example, decomposition monitoring platform 110 may compare the current decomposition rate of the materials and the historical decomposition rate of the materials (identified by the material information). If decomposition monitoring platform 110 determines that the current decomposition rate of the materials is different than the historical decomposition rate of the materials, decomposition monitoring platform 110 may update the material information of the materials (stored in knowledge corpus 120) using the current decomposition rate.

In other words, the historical decomposition rate may be updated using the current decomposition rate. Decomposition monitoring platform 110 may update the material information for future reference and to inform the design of future 3D printed objects. For example, the updated material information may be used to improve the design of future 3D printed objects that utilize the materials. For instance, the updated material information may be used to better plan the intended life of the 3D printed objects and better plan actions to take upon expiration of the intended life of the 3D printed objects.

As shown in FIG. 1E, and by reference number 175, decomposition monitoring platform 110 may determine whether the decomposition process is progressing as intended. For example, decomposition monitoring platform 110 may determine whether the decomposition process is progressing according to the decomposition rate.

As shown in FIG. 1E, and by reference number 180, decomposition monitoring platform 110 may perform an action based on determining whether the decomposition process is progressing as intended. For example, decomposition monitoring platform 110 may determine whether the decomposition process is progressing according to the decomposition rate. If the current decomposition rate is slower than the historical decomposition rate, decomposition monitoring platform 110 may perform an action to accelerate the decomposition process. For example, decomposition monitoring platform 110 may adjust the environmental conditions as explained herein.

In some examples, the 3D printed object may be partially or fully demolished to facilitate the decomposition process. In some cases, parts of the 3D printed object may have been printed without decomposition capability due to limited materials or budget necessitating the demolition. Accordingly, the 3D printed object may be partially or fully demolished to facilitate the decomposition process. In this regard, decomposition monitoring platform 110 may cause the disposal of any remaining waste materials in an environmentally friendly manner. In some implementations, changes in environment or changes in the desired life span may cause the 3D printed object to be partially or fully demolished.

Implementations described herein may be used to create objects that are intended to be used for a specific time period and then decomposed, thereby reducing the need for disposal and helping to reduce waste in the environment. By selecting the materials that are decomposable the as described herein, the system may eliminate or reduce the need for disposal.

Implementations described herein may be used to create objects that can be recycled or repurposed after they have served their original purpose. For example, the materials used to print the object could be selected such that the materials can be melted down and reused to create a new object. In some implementations, decomposition monitoring platform 110 may generate information regarding the disposal or recycling of any waste materials generated during the decomposition process. The information may identify the methods used and the locations where the waste materials are deposited.

As indicated above, FIGS. 1A-1E are provided as an example. Other examples may differ from what is described with regard to FIGS. 1A-1E. The number and arrangement of devices shown in FIGS. 1A-1E are provided as an example. A network, formed by the devices shown in FIGS. 1A-1E may be part of a network that comprises various configurations and uses various protocols including local Ethernet networks, private networks using communication protocols proprietary to one or more companies, cellular and wireless networks (e.g., Wi-Fi), instant messaging, Hypertext Transfer Protocol (HTTP) and simple mail transfer protocol (SMTP), and various combinations of the foregoing.

There may be additional devices (e.g., a large number of devices), fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
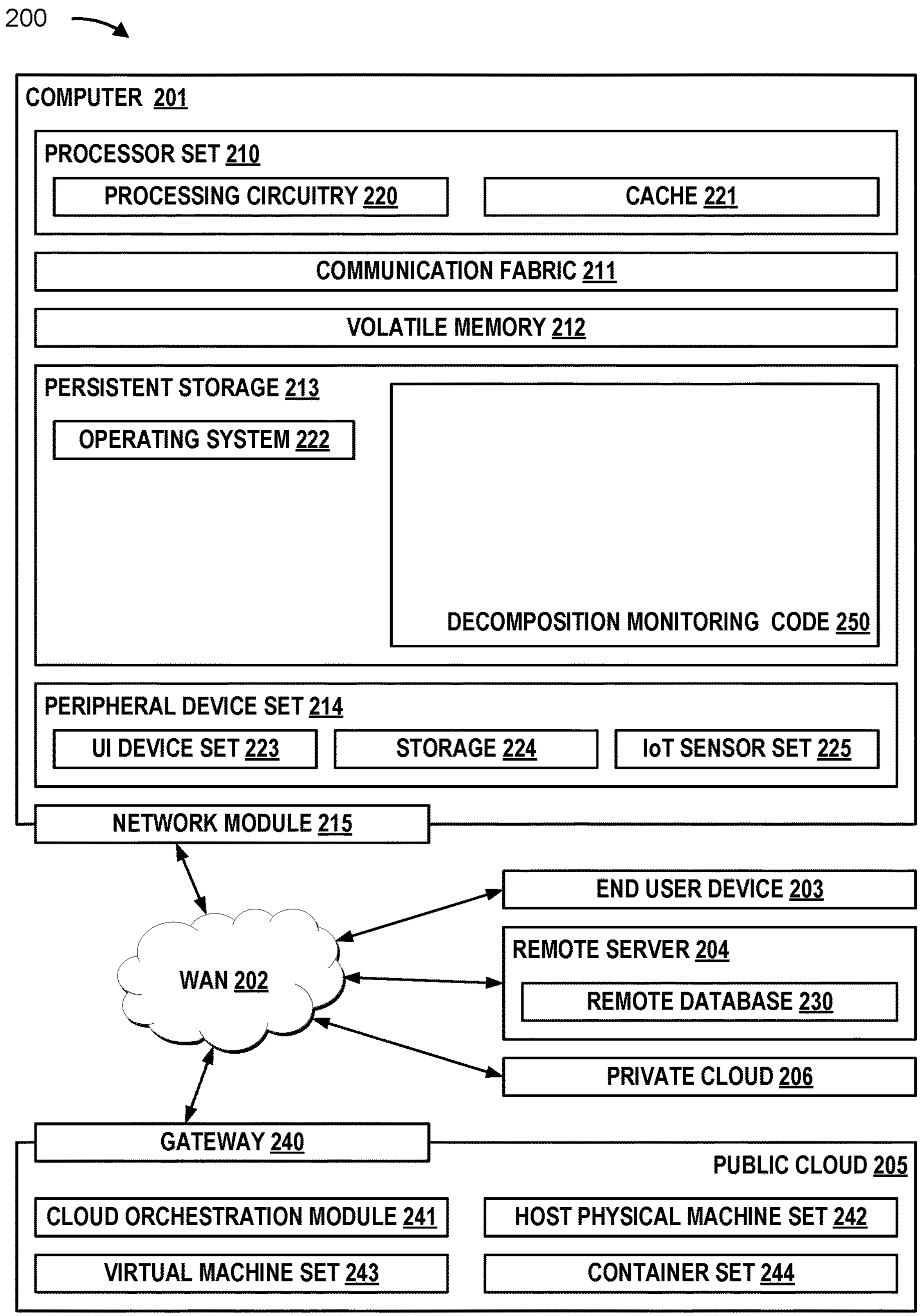
FIG. 2 is a diagram of an example computing environment in which systems and/or methods described herein may be implemented.

FIG. 2 is a diagram of an example computing environment 200 in which systems and/or methods described herein may be implemented. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 200 contains an example of an environment for the execution of at least some of the computer code involved in performing the inventive methods, such as decomposition monitoring code 250. In addition to block 250, computing environment 200 includes, for example, computer 201, wide area network (WAN) 202, end user device (EUD) 203, remote server 204, public cloud 205, and private cloud 206. In this embodiment, computer 201 includes processor set 210 (including processing circuitry 220 and cache 221), communication fabric 211, volatile memory 212, persistent storage 213 (including operating system 222 and block 250, as identified above), peripheral device set 214 (including user interface (UI) device set 223, storage 224, and Internet of Things (IoT) sensor set 225), and network module 215. Remote server 204 includes remote database 230. Public cloud 205 includes gateway 240, cloud orchestration module 241, host physical machine set 242, virtual machine set 243, and container set 244.

COMPUTER 201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

PROCESSOR SET 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in block 250 in persistent storage 213.

COMMUNICATION FABRIC 211 is the signal conduction path that allows the various components of computer 201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 212 is any type of volatile memory now known or to be developed in the future. Examples include dynamic type random access memory (RAM) or static type RAM. Typically, volatile memory 212 is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

PERSISTENT STORAGE 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid state storage devices. Operating system 222 may take several forms, such as various known proprietary operating systems or open source Portable Operating System Interface-type operating systems that employ a kernel. The code included in block 250 typically includes at least some of the computer code involved in performing the inventive methods.

PERIPHERAL DEVICE SET 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network (SAN) that is shared by multiple, geographically distributed computers. IoT sensor set 225 is made up of sensors that can be used in Internet of Things applications. For example, one sensor may be a thermometer and another sensor may be a motion detector.

NETWORK MODULE 215 is the collection of computer software, hardware, and firmware that allows computer 201 to communicate with other computers through WAN 202. Network module 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through a network adapter card or network interface included in network module 215.

WAN 202 is any wide area network (for example, the internet) capable of communicating computer data over non-local distances by any technology for communicating computer data, now known or to be developed in the future. In some embodiments, the WAN 202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 203 is any computer system that is used and controlled by an end user (for example, a customer of an enterprise that operates computer 201) and may take any of the forms discussed above in connection with computer 201. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

REMOTE SERVER 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

PUBLIC CLOUD 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments (VCEs) typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 206 is similar to public cloud 205, except that the computing resources are only available for use by a single enterprise. While private cloud 206 is depicted as being in communication with WAN 202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

Figure 3:
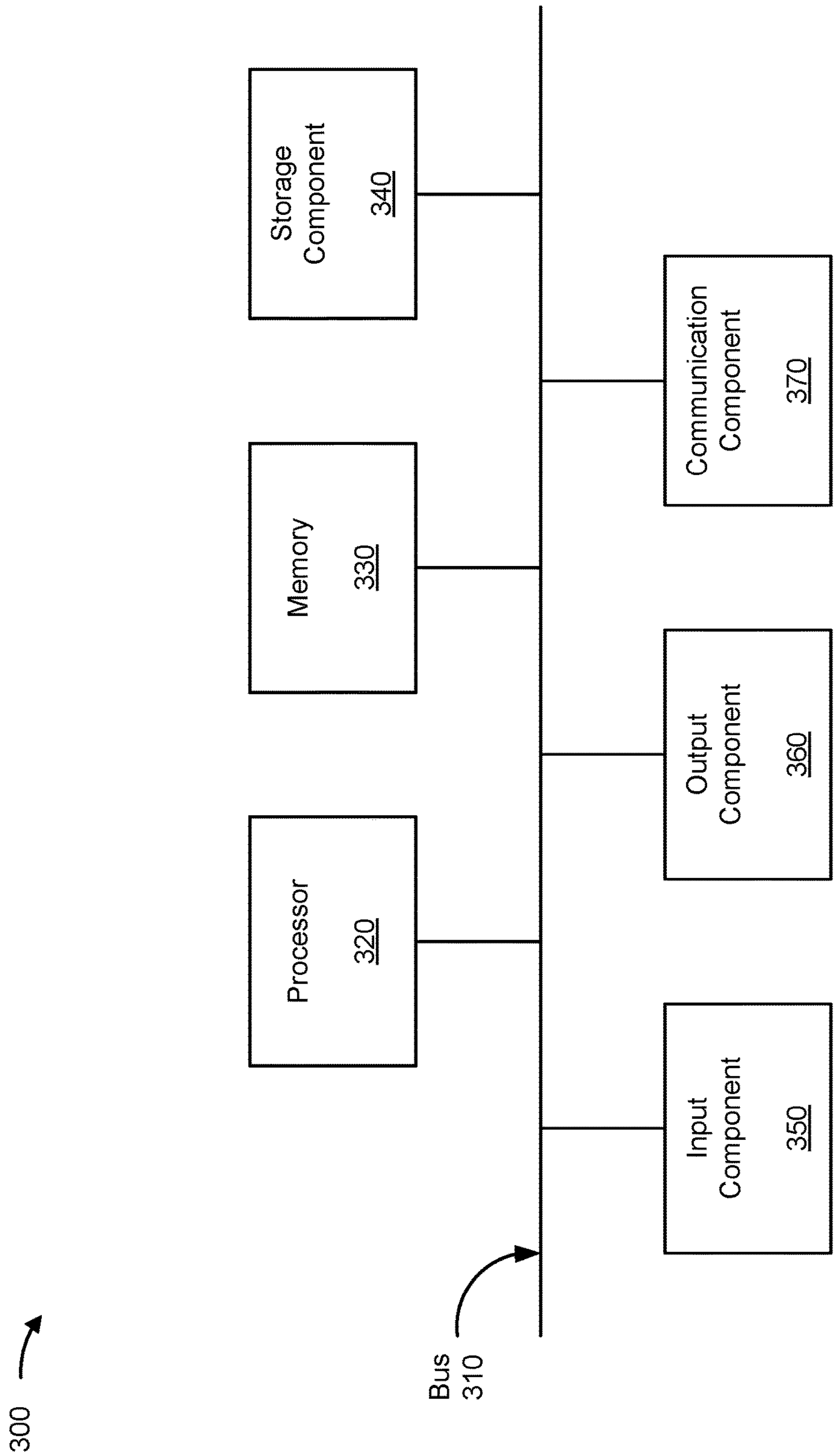
FIG. 3 is a diagram of example components of one or more devices of FIG. 1.

FIG. 3 is a diagram of example components of a device 300, which may correspond to user device 105 and/or decomposition monitoring platform 110. In some implementations, user device 105 and/or decomposition monitoring platform 110 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
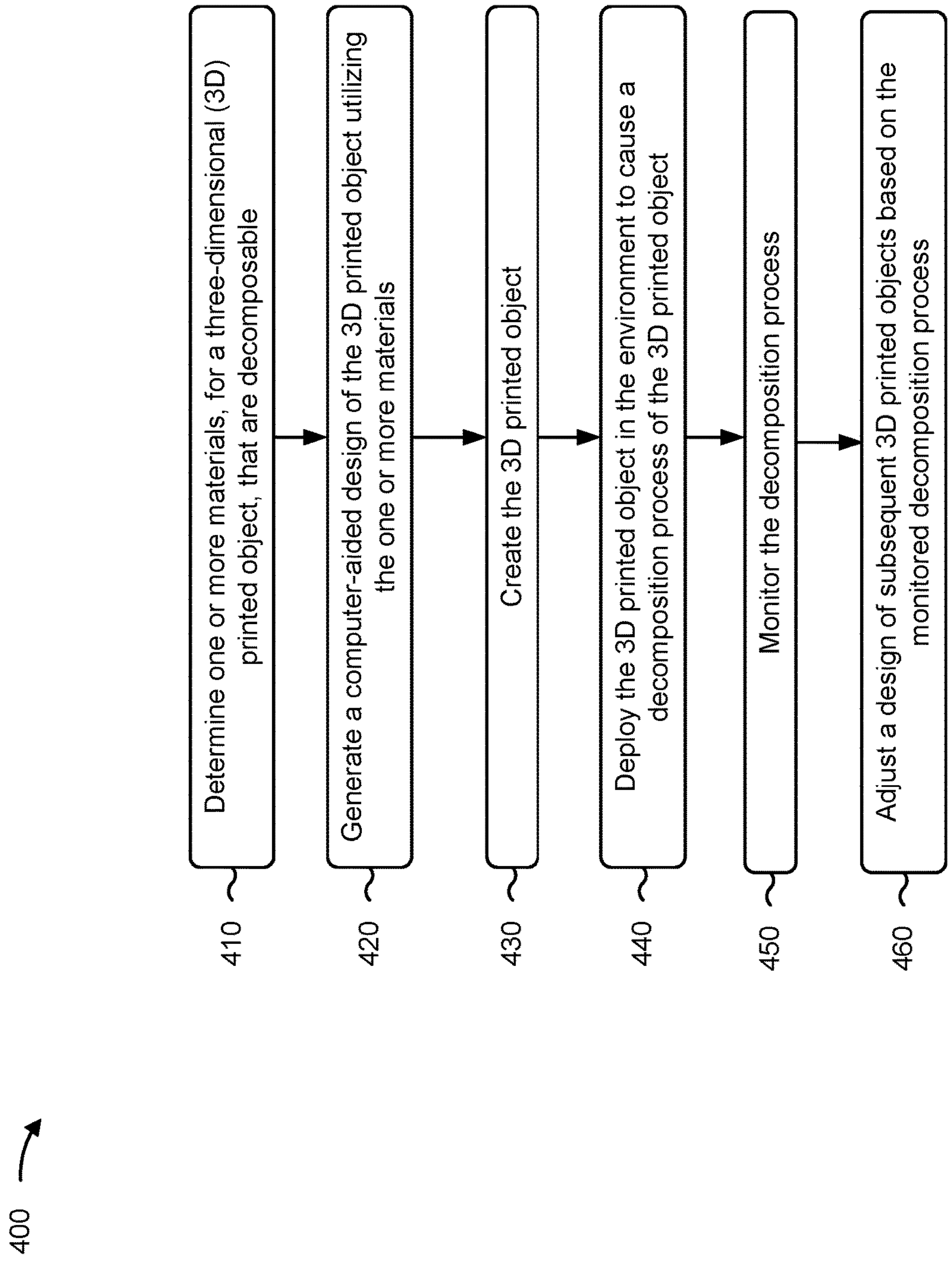
FIG. 4 is a flowchart of an example process associated with facilitating the decomposition process of an object created using additive manufacturing.

FIG. 4 is a flowchart of an example process 400 associated with FIG. 4. In some implementations, one or more process blocks of FIG. 4 may be performed by a decomposition monitoring platform (e.g., decomposition monitoring platform 110). In some implementations, one or more process blocks of FIG. 4 may be performed by another device or a group of devices separate from or including the printing segmentation platform, such as a user device (e.g., user device 105) and/or a monitoring device (e.g., monitoring device 125). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include determining one or more materials, for a three-dimensional (3D) printed object, that are decomposable (block 410). For example, the decomposition monitoring platform may determine one or more materials, for a three-dimensional (3D) printed object, that are decomposable in an environment, as described above. In some implementations, process 400 may include identifying the environment; and obtaining, from a data store, material information identifying one or more materials based on the environment.

As further shown in FIG. 4, process 400 may include generating a computer-aided design of the 3D printed object utilizing the determined one or more materials (block 420). For example, the decomposition monitoring platform may generate a computer-aided design of the 3D printed object utilizing the determined one or more materials, as described above.

As further shown in FIG. 4, process 400 may include creating the 3D printed object (block 430). For example, the decomposition monitoring platform may create the 3D printed object utilizing the generated computer-aided design and the determined one or more decomposable materials, as described above.

As further shown in FIG. 4, process 400 may include deploying the 3D printed object in the environment to cause a decomposition process of the 3D printed object to be initiated (block 440). For example, the decomposition monitoring platform may deploy the 3D printed object in the environment to cause a decomposition process of the 3D printed object to be initiated, as described above. In some implementations, process 400 may include configuring the 3D printed object to initiate the decomposition process at a specific date and time. Additionally, or alternatively, process 400 may include configuring the 3D printed object to initiate the decomposition process based on environmental conditions of the environment.

As further shown in FIG. 4, process 400 may include monitoring the decomposition process (block 450). For example, the decomposition monitoring platform may monitor the decomposition process of the 3D printed object in the environment, as described above. In some implementations, process 400 may include monitoring the decomposition process using one or more monitoring devices. The one or more monitoring devices comprise a camera device. Additionally, or alternatively, process 400 may include monitoring the decomposition process using one or more monitoring devices. The one or more monitoring devices comprise a sensor device.

As further shown in FIG. 4, process 400 may include adjusting a design of subsequent 3D printed objects based on the monitored decomposition process (block 460). For example, the decomposition monitoring platform may adjust a design of subsequent 3D printed objects based on the monitored decomposition process, as described above.

In some implementations, process 400 may include determining a current decomposition rate of the 3D printed object based on monitoring the decomposition process; comparing a historical decomposition rate of the 3D printed object and the current decomposition rate; determining a difference between the historical decomposition rate and the current decomposition rate; and updating the historical decomposition rate, based on the current decomposition rate. The adjusted historical decomposition rate is to adjust the design of the subsequent 3D printed objects.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A computer-implemented method for monitoring decomposition of materials, the computer-implemented method comprising:

determining one or more materials, for a three-dimensional (3D) printed object, that are decomposable in an environment;

generating a computer-aided design of the 3D printed object utilizing the determined one or more materials;

creating the 3D printed object utilizing the generated computer-aided design and the determined one or more decomposable materials, the 3D printed object being configured to simulate one or more environmental conditions associated with decomposition of the one or more materials;

deploying the 3D printed object in the environment;

emulating, by the 3D printed object, the one or more environmental conditions to cause a decomposition process of the 3D printed object to be initiated;

monitoring the decomposition process of the 3D printed object in the environment; and adjusting a design of subsequent 3D printed objects based on the monitored decomposition process.

2. The computer-implemented method of claim 1, further comprising:

determining a current decomposition rate of the 3D printed object based on monitoring the decomposition process;

comparing a historical decomposition rate of the 3D printed object and the current decomposition rate;

determining a difference between the historical decomposition rate and the current decomposition rate; and updating the historical decomposition rate, based on the current decomposition rate, wherein the updated historical decomposition rate is to adjust the design of the subsequent 3D printed objects.

3. The computer-implemented method of claim 1, wherein determining the one or more materials comprises:

identifying an environment; and obtaining, from a data store, material information identifying the one or more materials based on the environment.

4. The computer-implemented method of claim 1, wherein monitoring the decomposition process comprises:

monitoring the decomposition process using one or more monitoring devices, wherein the one or more monitoring devices comprise a camera device.

5. The computer-implemented method of claim 1, wherein monitoring the decomposition process comprises:

monitoring the decomposition process using one or more monitoring devices, wherein the one or more monitoring devices comprise a sensor device.

6. The computer-implemented method of claim 1, wherein deploying the 3D printed object in the environment comprises:

configuring the 3D printed object to initiate the decomposition process at a specific date and time.

7. The computer-implemented method of claim 1, wherein deploying the 3D printed object in the environment comprises:

configuring the 3D printed object to initiate the decomposition process based on the one or more environmental conditions of the environment.

8. A computer program product comprising:

one or more computer readable storage media, and program instructions collectively stored on the one or more computer readable storage media, the program instructions comprising:

program instructions to obtain, from a data store, material information identifying one or more materials, for a first three-dimensional (3D) printed object, that are decomposable in an environment;

program instructions to design the first 3D printed object based on the material information;

program instructions to create the first 3D printed object utilizing the one or more materials, the 3D printed object being configured to simulate one or more environmental conditions associated with decomposition of the one or more materials;

program instructions to configure the first 3D printed object to emulate the one or more environmental conditions to initiate a decomposition process of the first 3D printed object in the environment;

program instructions to monitor the decomposition process of the first 3D printed object in the environment; and program instructions to adjust a design of a second 3D printed object based on the monitored decomposition process.

9. The computer program product of claim 8, wherein the program instructions to design the first 3D printed object comprise:

program instructions to generate a computer-aided design of the 3D printed object utilizing the one or more materials, wherein the first 3D printed object is created further utilizing the generated computer-aided design.

10. The computer program product of claim 8, wherein the program instructions to adjust design of the second 3D printed object comprise:

program instructions to update the material information using information regarding the monitored decomposition process; and program instructions to adjust the design of the second 3D printed object using the updated material information.

11. The computer program product of claim 8, wherein the program instructions to configure the first 3D printed object to initiate the decomposition process comprise:

program instructions to configure the first 3D printed object to initiate the decomposition process using a machine embedded within the first 3D printed object.

12. The computer program product of claim 8, wherein the program instructions to configure the first 3D printed object to initiate the decomposition process comprise:

program instructions to configure the first 3D printed object to initiate the decomposition process through a reaction with the one or more environmental conditions of the environment.

13. The computer program product of claim 8, wherein the material information identifies a decomposition rate of the one or more materials, and wherein the program instructions further comprise:

program instructions to design the first 3D printed object based on the decomposition rate.

14. The computer program product of claim 8, wherein the data stores first information identifying different materials and second information identifying decomposition rates of the different materials in different environments.

15. A system comprising:

one or more devices configured to:

obtain, from a data store, material information identifying a decomposition rate of one or more materials in an environment;

design a first object for additive manufacturing based on the decomposition rate, the first object being configured to simulate one or more environmental conditions associated with decomposition of the one or more materials;

create the first object utilizing the one or more materials and an additive manufacturing printer after designing the object;

configure the first object to emulate the one or more environmental conditions to initiate a decomposition process of the first object in the environment;

monitor the decomposition process of the first object in the environment; and adjust a design of a second object based on the monitored decomposition process.

16. The system of claim 15, wherein the first object is a three-dimensional (3D) object, and wherein the additive manufacturing printer is a 3D printer.

17. The system of claim 15, wherein the first object is a four-dimensional object, and wherein the additive manufacturing printer is a 4D printer.

18. The system of claim 15, wherein the decomposition rate is a historical decomposition rate, and wherein the one or more devices are further configured to:

determine a current decomposition rate of the one or more materials based on monitoring the decomposition process;

determine that the current decomposition rate is different than the historical decomposition rate; and update the material information, in the data store, using the current decomposition rate.

19. The system of claim 15, wherein, to obtain the material information, the one or more devices are configured to:

obtain, from the data store, the material information based on information identifying the environment.

20. The system of claim 15, wherein the one or more devices, to configure the first object to initiate the decomposition process, are further configured to:

configure the first object to initiate the decomposition process through a reaction with the one or more environmental conditions of the environment.

* * * * *